US012638967B2

(12) United States Patent
Mo

(10) Patent No.: US 12,638,967 B2
(45) Date of Patent: May 26, 2026

(54) METHOD FOR DEVICE CONTROL, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventor: Boyu Mo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 44 days.

(21) Appl. No.: 18/146,905

(22) Filed: Dec. 27, 2022

(65) Prior Publication Data

US 2023/0139376 A1     May 4, 2023

Related U.S. Application Data

(63) Continuation of application No. PCT/CN2021/097697, filed on Jun. 1, 2021.

(30) Foreign Application Priority Data

Jul. 9, 2020     (CN) ........................ 202010658123.X

(51) Int. Cl.
G06F 3/0488 (2022.01)
G06F 3/0481 (2022.01)
G06F 3/04845 (2022.01)

(52) U.S. Cl.
CPC .......... G06F 3/0488 (2013.01); G06F 3/0481 (2013.01); G06F 3/04845 (2013.01)

(58) Field of Classification Search
CPC .. G06F 3/0488; G06F 3/0481; G06F 3/04845; G06F 3/04817; G06F 3/04883; G06F 3/0484
See application file for complete search history.

(56) References Cited

U.S. PATENT DOCUMENTS 9,588,645 B2 * 3/2017 Heo ...................... G06F 3/0482
2010/0011316 A1 * 1/2010 Sar .......................... G06F 9/451
715/802

(Continued)

FOREIGN PATENT DOCUMENTS

CN     102200875     9/2011
CN     103106011     5/2013

(Continued)

OTHER PUBLICATIONS

EPO, Extended European Search Report for EP Application No. 21837647.3, Nov. 29, 2023.

(Continued)

*Primary Examiner* — Angie Badawi
(74) *Attorney, Agent, or Firm* — Hodgson Russ LLP

(57)     ABSTRACT

A method, an electronic device, and a storage medium are provided. The method for device control can include the following. A first gesture is received, where the first gesture matches a preset trigger gesture. At least one icon is displayed on a touch display screen, where each icon represents one window mode. An end position of the first gesture is obtained. A window mode represented by a target icon in the at least one icon is determined as a target window mode, upon detecting that the end position of the first gesture is at a display position of the target icon. Information of a target application is obtained, and the information of the target application is displayed in the target window mode, where the target application is an application corresponding to information displayed on the touch display screen when the first gesture is received.

19 Claims, 14 Drawing Sheets

(56) References Cited

U.S. PATENT DOCUMENTS

| | | | |
|---|---|---|---|
| 2013/0033483 A1 | 2/2013 | Im et al. | |
| 2013/0113742 A1 | 5/2013 | Jin et al. | |
| 2014/0368422 A1* | 12/2014 | Gupta | G06F 3/0304 |
| | | | 345/156 |
| 2015/0365306 A1* | 12/2015 | Chaudhri | G06Q 10/10 |
| | | | 715/753 |
| 2016/0358505 A1* | 12/2016 | Isted | A63F 13/537 |
| 2019/0369842 A1 | 12/2019 | Dolbakian et al. | |
| 2020/0034009 A1* | 1/2020 | Sharma | G06F 3/0482 |
| 2021/0333960 A1* | 10/2021 | Beri | G06F 3/0486 |

FOREIGN PATENT DOCUMENTS

| | | |
|---|---|---|
| CN | 103870116 | 6/2014 |
| CN | 104503689 | 4/2015 |
| CN | 107302724 | 10/2017 |
| CN | 107368511 | 11/2017 |
| CN | 110347317 | 10/2019 |
| CN | 111831205 | 10/2020 |
| JP | 2010039991 | 2/2010 |
| JP | 2016520946 | 7/2016 |
| JP | 2018535455 | 11/2018 |
| JP | 2019532436 | 11/2019 |
| KR | 20170093358 | 8/2017 |
| WO | 2018082269 | 5/2018 |

OTHER PUBLICATIONS

JPO, Office Action for JP Application No. 2023-500440, Feb. 9, 2024.

WIPO, International Search Report and Written Opinion for International Application No. PCT/CN2021/097697, Aug. 25, 2021.

CNIPA, First Office Action for CN Application No. 202010658123.X, Jun. 2, 2021.

CNIPA, Third Office Action for CN Application No. 202010658123.X, Mar. 30, 2022.

IPI, Office Action for IN Application No. 202317006775, Mar. 4, 2024.

CNIPA, First Office Action for CN Application No. 202211052153.1, May 8, 2025.

CNIPA, First Office Action for CN Application No. 202211043518.4, Jun. 11, 2025.

CNIPA, Rejection Decision for CN Application No. 202211052153.1, Sep. 15, 2025.

CNIPA, Rejection Decision for CN Application No. 202211043518.4, Oct. 27, 2025.

* cited by examiner

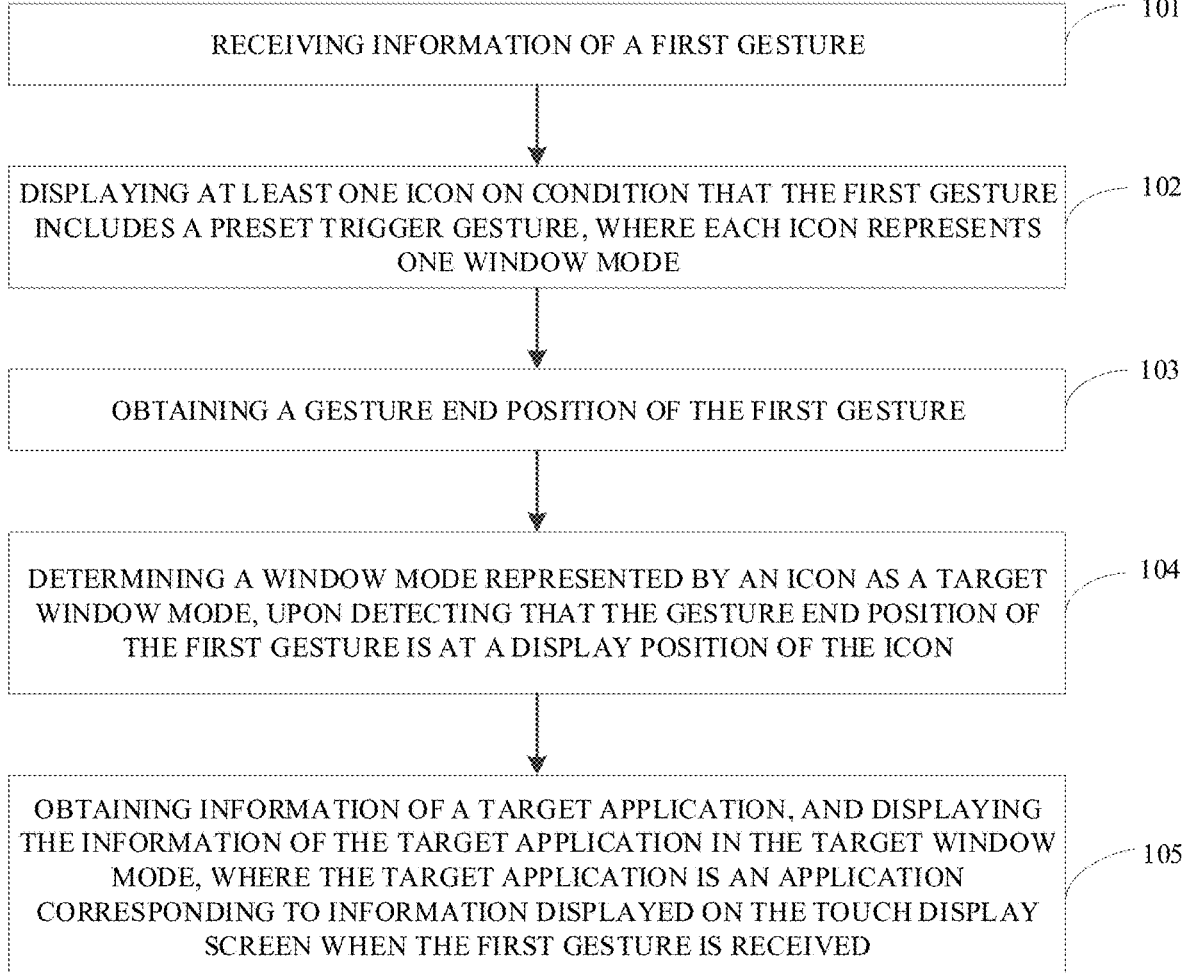

RECEIVING INFORMATION OF A FIRST GESTURE — 101

DISPLAYING AT LEAST ONE ICON ON CONDITION THAT THE FIRST GESTURE INCLUDES A PRESET TRIGGER GESTURE, WHERE EACH ICON REPRESENTS ONE WINDOW MODE — 102

OBTAINING A GESTURE END POSITION OF THE FIRST GESTURE — 103

DETERMINING A WINDOW MODE REPRESENTED BY AN ICON AS A TARGET WINDOW MODE, UPON DETECTING THAT THE GESTURE END POSITION OF THE FIRST GESTURE IS AT A DISPLAY POSITION OF THE ICON — 104

OBTAINING INFORMATION OF A TARGET APPLICATION, AND DISPLAYING THE INFORMATION OF THE TARGET APPLICATION IN THE TARGET WINDOW MODE, WHERE THE TARGET APPLICATION IS AN APPLICATION CORRESPONDING TO INFORMATION DISPLAYED ON THE TOUCH DISPLAY SCREEN WHEN THE FIRST GESTURE IS RECEIVED — 105

FIG. 1

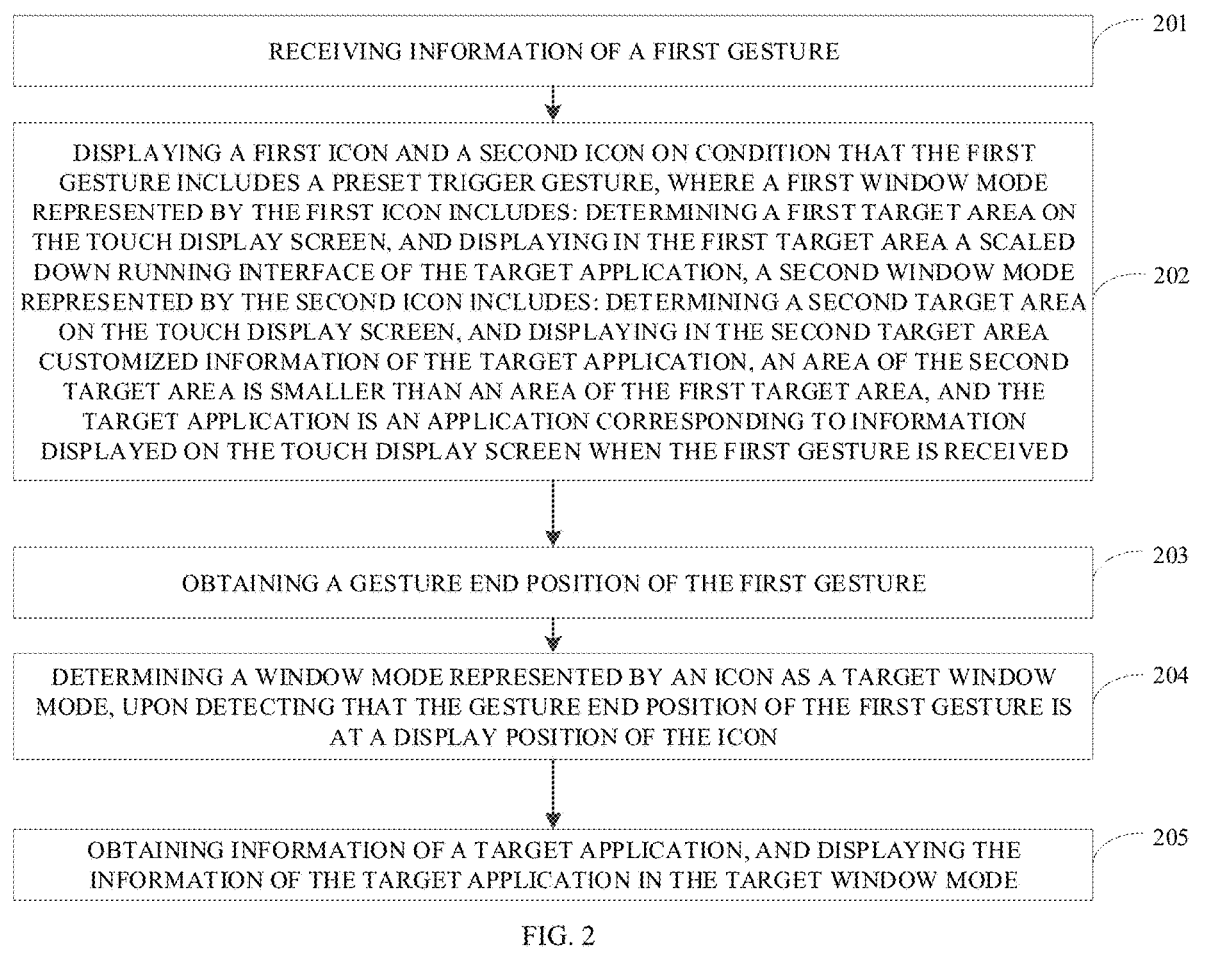

RECEIVING INFORMATION OF A FIRST GESTURE ⌐ 201

DISPLAYING A FIRST ICON AND A SECOND ICON ON CONDITION THAT THE FIRST GESTURE INCLUDES A PRESET TRIGGER GESTURE, WHERE A FIRST WINDOW MODE REPRESENTED BY THE FIRST ICON INCLUDES: DETERMINING A FIRST TARGET AREA ON THE TOUCH DISPLAY SCREEN, AND DISPLAYING IN THE FIRST TARGET AREA A SCALED DOWN RUNNING INTERFACE OF THE TARGET APPLICATION, A SECOND WINDOW MODE REPRESENTED BY THE SECOND ICON INCLUDES: DETERMINING A SECOND TARGET AREA ON THE TOUCH DISPLAY SCREEN, AND DISPLAYING IN THE SECOND TARGET AREA CUSTOMIZED INFORMATION OF THE TARGET APPLICATION, AN AREA OF THE SECOND TARGET AREA IS SMALLER THAN AN AREA OF THE FIRST TARGET AREA, AND THE TARGET APPLICATION IS AN APPLICATION CORRESPONDING TO INFORMATION DISPLAYED ON THE TOUCH DISPLAY SCREEN WHEN THE FIRST GESTURE IS RECEIVED ⌐ 202

OBTAINING A GESTURE END POSITION OF THE FIRST GESTURE ⌐ 203

DETERMINING A WINDOW MODE REPRESENTED BY AN ICON AS A TARGET WINDOW MODE, UPON DETECTING THAT THE GESTURE END POSITION OF THE FIRST GESTURE IS AT A DISPLAY POSITION OF THE ICON ⌐ 204

OBTAINING INFORMATION OF A TARGET APPLICATION, AND DISPLAYING THE INFORMATION OF THE TARGET APPLICATION IN THE TARGET WINDOW MODE ⌐ 205

FIG. 2

ENTER MULTI-TASK
MANAGEMENT INTERFACE

METHOD FOR DEVICE CONTROL, ELECTRONIC DEVICE, AND STORAGE MEDIUM

CROSS-REFERENCE TO RELATED APPLICATION(S)

This application is a continuation of International Application No. PCT/CN2021/097697, filed Jun. 1, 2021, which claims priority to Chinese Patent Application No. 202010658123.X, filed Jul. 9, 2020, the entire disclosures of which are incorporated herein by reference.

TECHNICAL FIELD

The disclosure relates to the technical field of electronic devices, and in particular, to a method for device control, an electronic device, and a storage medium.

BACKGROUND

With technology development, the way of human-computer interaction is becoming more and more diverse. For example, the user can interact with the electronic device by touching the display screen or via voice control, etc.

SUMMARY

In a first aspect, implementations of the disclosure provide a method for device control. The method is applied to an electronic device with a touch display screen and includes the following. A first gesture is received, where the first gesture matches a preset trigger gesture. At least one icon is displayed on the touch display screen, where each icon represents one window mode. An end position of the first gesture is obtained. A window mode represented by a target icon in the at least one icon is determined as a target window mode, upon detecting that the end position of the first gesture is at a display position of the target icon. Information of a target application is obtained, and the information of the target application is displayed in the target window mode, where the target application is an application corresponding to information displayed on the touch display screen when the first gesture is received.

In a second aspect, implementations of the disclosure provide an electronic device. The electronic device includes a touch display screen, a memory configured to store computer programs, a processor configured to invoke the computer programs stored in the memory to: receive a first gesture, where the first gesture matches a preset trigger gesture, display, on the touch display screen, at least one icon, where each icon represents one window mode, obtain an end position of the first gesture, determine a window mode represented by a target icon in the at least one icon as a target window mode, upon detecting that the end position of the first gesture is at a display position of the target icon, and obtain information of a target application, and display the information of the target application in the target window mode, where the target application is an application corresponding to information displayed on the touch display screen when the first gesture is received.

In a third aspect, implementations of the disclosure provide a storage medium. The storage medium stores computer programs, which when executed on a computer, cause the computer to: receive a first gesture, where the first gesture matches a preset trigger gesture, display at least one icon on the touch display screen, where each icon represents one window mode, obtain an end position of the first gesture, determine a window mode represented by a target icon in the at least one icon as a target window mode, upon detecting that the end position of the first gesture is at a display position of the target icon, and obtain information of a target application, and display the information of the target application in the target window mode, where the target application is an application corresponding to information displayed on the touch display screen when the first gesture is received.

BRIEF DESCRIPTION OF THE DRAWINGS

The technical solutions and other beneficial effects of the disclosure will be apparent through the detailed description of the specific implementations of the disclosure in conjunction with the accompanying drawings.

FIG. 1 is a schematic flowchart of a method for device control provided in implementations of the disclosure.

FIG. 2 is another schematic flowchart of a method for device control provided in implementations of the disclosure.

DETAILED DESCRIPTION

Figure 3:
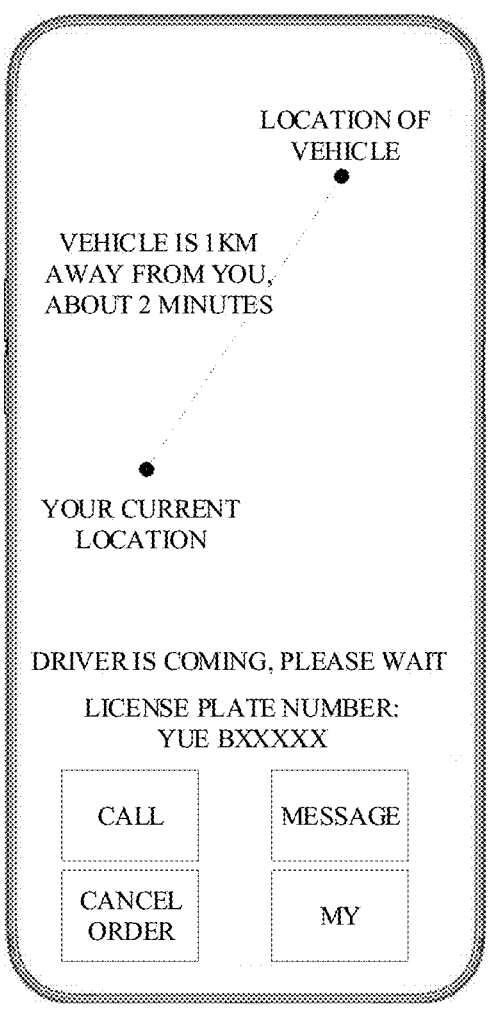
FIGS. 3 to 12 are schematic diagrams illustrating various scenarios of a method for device control provided in implementations of the disclosure.

Referring to the drawings, same component symbols represent same components. The principle of the disclosure is illustrated by implementation in an appropriate computing environment. The following description is based on the illustrated specific implementations of the disclosure, which should not be considered as limiting other specific implementations not detailed herein.

It can be understood that, implementations of the disclosure may be implemented by an electronic device such as a smart phone or a tablet computer.

Implementations of the disclosure provide a method for device control. The method is applied to an electronic device with a touch display screen and includes the following. Information of a first gesture is received. Specifically, the first gesture is received. At least one icon is displayed on condition that the first gesture includes a preset trigger gesture, where each icon represents one window mode, and the preset trigger gesture is preset in advance. Specifically, the at least one icon is displayed on the touch display screen, where each icon represents one window mode. A gesture end position of the first gesture is obtained. Specifically, an end position of the first gesture is obtained. A window mode represented by an icon is determined as a target window mode, upon detecting that the gesture end position of the first gesture is at a display position of the icon. Specifically, a window mode represented by a target icon in the at least one icon is determined as a target window mode, upon detecting that the end position of the first gesture is at a display position of the target icon. Information of a target application is obtained, and the information of the target application is displayed in the target window mode, where the target application is an application corresponding to information displayed on the touch display screen when the first gesture is received.

In an implementation, the first gesture includes a first gesture-segment and a second gesture-segment, the first gesture-segment occurs before the second gesture-segment, the first gesture-segment and the second gesture-segment have a continuous gesture trajectory, and the first gesture including the preset trigger gesture includes: the first gesture-segment matching the preset trigger gesture. In other words, the first gesture matches the preset trigger gesture when the first gesture-segment matches the preset trigger gesture.

In an implementation, the icon displayed by the electronic device includes at least a first icon, and a first window mode represented by the first icon includes: determining a first target area on the touch display screen, and displaying in the first target area a scaled down running interface of the target application. Specifically, the at least one icon includes a first icon, the target icon is the first icon, the first icon represents a first window mode, and the information of the target application is displayed in the target window mode as follows. A scaled down running interface of the target application is displayed in a first target area corresponding to the first window mode in the first window mode.

In an implementation, the icon displayed by the electronic device further include at least a second icon, and a second window mode represented by the second icon includes: determining a second target area on the touch display screen, and displaying in the second target area the information of the target application, where an area of the second target area is smaller than an area of the first target area. Specifically, the at least one icon includes a first icon and a second icon, the target icon is the second icon, the first icon represents a first window mode, the second icon represents a second window mode, and the information of the target application is displayed in the target window mode as follows. The information of the target application is displayed in a second target area corresponding to the second window mode in the second window mode, where an area of the second target area is smaller than an area of a first target area corresponding to the first window mode.

In an implementation, the second window mode represented by the second icon includes: determining the second target area on the touch display screen, and displaying in the second target area customized information of the target application. Specifically, the information of the target application is displayed in the target window mode as follows. The customized information of the target application is displayed in the second target area corresponding to the second window mode in the second window mode.

In an implementation, the first gesture-segment and the second gesture-segment of the first gesture include a touch operation performed on the touch display screen, specifically, the first gesture-segment and the second gesture-segment are each touch operations performed on the touch display screen, and the first gesture-segment and the second gesture-segment having the continuous gesture trajectory includes: the first gesture-segment and the second gesture-segment having a continuous touch trajectory on the touch display screen.

In an implementation, the first gesture-segment and the second gesture-segment of the first gesture each include an air gesture, specifically, the first gesture-segment and the second gesture-segment are each touch operations performed on the touch display screen, and the first gesture-segment and the second gesture-segment having the continuous gesture trajectory includes: the first gesture-segment and the second gesture-segment having a continuous air gesture trajectory.

In an implementation, the at least one icon is displayed on condition that the first gesture-segment matches the preset trigger gesture as follows. Determine that the first gesture-segment matches the preset trigger gesture and display the at least one icon, on condition that a motion of the first gesture-segment is the same as a motion of the preset trigger gesture and a trajectory length of the first gesture-segment is greater than or equal to a first preset length, where the first preset length is preset in advance. In other words, the first gesture-segment matches the preset trigger gesture when a motion of the first gesture-segment is the same as a motion of the preset trigger gesture and a trajectory length of the first gesture-segment is greater than or equal to a first preset length.

In an implementation, the preset trigger gesture starts at an edge of the touch display screen.

In an implementation, the method for device control further includes the following. A displayed running interface of the target application is scaled down to a preset size gradually, from receiving the first gesture until the first gesture ends.

In an implementation, the method for device control further includes the following. The gradually scaled down running interface of the target application is moved in a preset direction.

In an implementation, the method for device control further includes the following. A preview of a window mode represented by an icon is displayed at a preset position of the touch display screen, on condition that the first gesture pauses at a display position of the icon, before the first gesture ends.

In an implementation, the method for device control further includes the following. Information of a second gesture is received. A multi-task management interface is entered, on condition that a motion of the second gesture is the same as the motion of the preset trigger gesture and a trajectory length of the second gesture is less than the first preset length and greater than a second preset length. The second preset length is preset in advance.

Referring to FIG. 1, FIG. 1 is a schematic flowchart of a method for device control provided in implementations of the disclosure. The method may be applied to an electronic device with a touch display screen and include the following.

101. Information of a first gesture is received. Specifically, the first gesture is received, where the first gesture matches a preset trigger gesture.

With technology development, the way of human-computer interaction is becoming more and more diverse. For example, the user can interact with the electronic device by touching the display screen or via voice control, etc. However, in the related art, the operability of the electronic device is still low during interaction.

In implementations of the disclosure, for example, the electronic device may receive a gesture from a user. For example, the gesture is recorded as the first gesture. That is, the electronic device may receive the information of the first gesture.

102. At least one icon is displayed on condition that the first gesture includes a preset trigger gesture, where each icon represents one window mode. Specifically, the at least one icon is displayed on the touch display screen, each icon represents one window mode.

For example, when receiving the information of the first gesture, the electronic device may detect whether the first gesture includes the preset trigger gesture.

It should be noted that, in these implementations, the first gesture is a complete and coherent gesture. The first gesture is, for example, a touch operation on the touch display screen. The first gesture being a complete and coherent gesture may mean that during making the first gesture, the finger of the user always keeps in contact with the touch display screen without leaving the touch display screen.

Then, the first gesture including the preset trigger gesture may mean that, for example, when the first gesture is decomposed into multiple gesture-segments, one gesture-segment of the first gesture matches the preset trigger gesture. For example, the first gesture is decomposed into two gesture-segments, i.e., a former gesture-segment and a latter gesture-segment, then if the former gesture-segment matches the preset trigger gesture, the first gesture can be considered to include the preset trigger gesture, if the latter gesture-segment matches the preset trigger gesture, the first gesture can also be considered to include the preset trigger gesture. However, if the former gesture-segment and the latter gesture-segment both fails to match the preset trigger gesture, the first gesture does not include the preset trigger gesture.

The electronic device may perform other operations if the first gesture does not include the preset trigger gesture.

The electronic device may trigger the touch display screen of the electronic device to display at least one icon if the first gesture includes the preset trigger gesture, where each icon may represent a window mode.

It should be noted that, the window mode may mean that the electronic device can create a window on the display screen, and display in the window information that the user wants to display, such as a running interface of an application specified by the user, or information of a currently running application, such as a foreground application, etc.

103. A gesture end position of the first gesture is obtained. Specifically, an end position of the first gesture is obtained.

For example, after displaying the at least one icon, the electronic device may further obtain the gesture end position of the first gesture upon detecting that the first gesture ends.

After obtaining the gesture end position of the first gesture, the electronic device can detect whether the gesture end position of the first gesture is at a display position of a certain icon.

It should be noted that, the gesture end position of the first gesture being at the display position of a certain icon may mean that, for example, a display position of a certain icon is position A, if the gesture end position of the first gesture is also position A, the gesture end position of the first gesture is at the display position of the icon. For example, if the first gesture is a touch operation on the touch display screen, a touch position of the last touch operation is the gesture end position of the first gesture. For example, if the finger of the user slides to position A of the touch display screen and then leaves the touch display screen, the touch position of the last touch operation is position A. If a display position of a certain icon is also position A, the gesture end position of the first gesture is at the display position of the icon.

The electronic device may perform other operations upon detecting that the gesture end position of the first gesture is not at a display position of any icon.

Proceed to 104 upon detecting that the gesture end position of the first gesture is at a display position of a certain icon.

104. A window mode represented by an icon is determined as a target window mode, upon detecting that the gesture end position of the first gesture is at a display position of the icon. Specifically, a window mode represented by a target icon in the at least one icon is determined as the target window mode, upon detecting that the end position of the first gesture is at the display position of the target icon.

For example, if the electronic device detects that the gesture end position of the first gesture is at a display position of a certain icon, the electronic device may determine a window mode represented by the icon as the target window mode.

For example, the electronic device displays two icons on the touch display screen, i.e., a first icon and a second icon. If the electronic device detects that the gesture end position of the first gesture is at a display position of the first icon, the electronic device may determine a window mode represented by the first icon as the target window mode.

105. Information of a target application is obtained, and the information of the target application is displayed in the target window mode, where the target application is an application corresponding to information displayed on the touch display screen when the first gesture is received.

For example, after determining the target window mode, the electronic device can obtain the information of the target application, and display the information of the target application in the target window mode, where the target application is the application corresponding to the information displayed on the touch display screen when the first gesture is received.

For example, a running interface of car-hailing application Y is displayed on the touch display screen when the first gesture is received. After the target window mode is determined, the electronic device may display information of car-hailing application Y in the target window mode.

In implementations of the disclosure, different window modes may differ in window size, window area, window position, and the like.

It can be understood that, in implementations of the disclosure, the electronic device may receive the information of the first gesture, and display the at least one icon upon detecting that the first gesture includes the preset trigger gesture, where each icon represents one window mode. Then, the electronic device may obtain the gesture end position of the first gesture. When the gesture end position of the first gesture is at a display position of a certain icon, the electronic device may determine the window mode represented by the icon as the target window mode. Then, the electronic device may display the information of the target application in the target window mode, where the target application is the application corresponding to the information displayed on the touch display screen when the first gesture is received. In implementations of the disclosure, the electronic device can display the information of the target application in the corresponding window mode when the first gesture including the preset trigger gesture is received. Therefore, the electronic device can quickly enter a certain window mode. That is, with implementations of the disclosure, the operability of the electronic device can be improved.

Referring to FIG. 2, FIG. 2 is another schematic flowchart of a method for device control provided in implementations of the disclosure. The method may be applied to an electronic device with a touch display screen and include the following.

201. Information of a first gesture is received.

For example, in these implementations, the gesture includes a touch operation performed by the user on the touch display screen.

For example, as illustrated in FIG. 3, a running interface of car-hailing application Y is currently displayed on the touch display screen of the electronic device. At this time, a touch gesture is performed by the user on the touch display screen. That is, the electronic device may receive information of the touch gesture from the user and record the touch gesture as the first gesture.

When receiving the first gesture, the electronic device may detect whether the first gesture includes a preset trigger gesture.

It should be noted that, in these implementations, the first gesture is a complete and coherent gesture. The first gesture is, for example, a touch operation on the touch display screen. The first gesture being a complete and coherent gesture may mean that during making the first gesture, the finger of the user always keeps in contact with the touch display screen without leaving the touch display screen.

Then, the first gesture including the preset trigger gesture may mean that, for example, when the first gesture is decomposed into multiple gesture-segments, one gesture-segment of the first gesture matches the preset trigger gesture.

For example, in an implementation, the first gesture is decomposed into a first gesture-segment and a second gesture-segment, the first gesture-segment occurs before the second gesture-segment, and the first gesture-segment and the second gesture-segment have a continuous gesture trajectory.

Then, the first gesture including the preset trigger gesture may include: the first gesture-segment matching the preset trigger gesture. In other words, the first gesture matches the preset trigger gesture when the first gesture-segment matches the preset trigger gesture.

The electronic device may perform other operations if the first gesture does not include the preset trigger gesture.

Proceed to 202 if the first gesture includes the preset trigger gesture.

202. A first icon and a second icon are displayed on condition that the first gesture includes a preset trigger gesture, where a first window mode represented by the first icon includes: determining a first target area on the touch display screen, and displaying in the first target area a scaled down running interface of the target application, and a second window mode represented by the second icon includes: determining a second target area on the touch display screen, and displaying in the second target area customized information of the target application. An area of the second target area is smaller than an area of the first target area. The target application is an application corresponding to information displayed on the touch display screen when the first gesture is received.

For example, the preset trigger gesture is a slide-up operation starting from the bottom of the touch display screen, and a slide trajectory corresponding to the slide-up operation reaches a first preset length. Then, if the first gesture-segment of the first gesture received by the electronic device from the user is a slide-up operation starting from the bottom of the touch display screen, and a slide trajectory of the slide-up operation reaches the first preset length, it is determined that the received first gesture includes the preset trigger gesture. At this time, the electronic device may be triggered to display on the display screen of the electronic device two icons, i.e., the first icon and the second icon. The first window mode represented by the first icon includes: determining the first target area on the touch display screen, and displaying in the first target area the scaled down running interface of the target application. The second window mode represented by the second icon includes: determining the second target area on the touch display screen, and displaying in the second target area the customized information of the target application. The area of the second target area is smaller than the area of the first target area. The target application is the application corresponding to the information displayed on the touch display screen when the first gesture is received.

In an implementation, the customized information of the target application displayed in the second window mode may be the latest notification information or other information of the target application. For example, if the target application is an instant messaging application, the latest notification information of the instant messaging application may be displayed in the second window mode. Alternatively, if the target application is a map navigation application, information of the current location of the user and the like may be displayed in the second window mode. That is, the specific customized information to be displayed can be determined according to the type of the application or user requirements, which is not limited herein.

Figure 4:
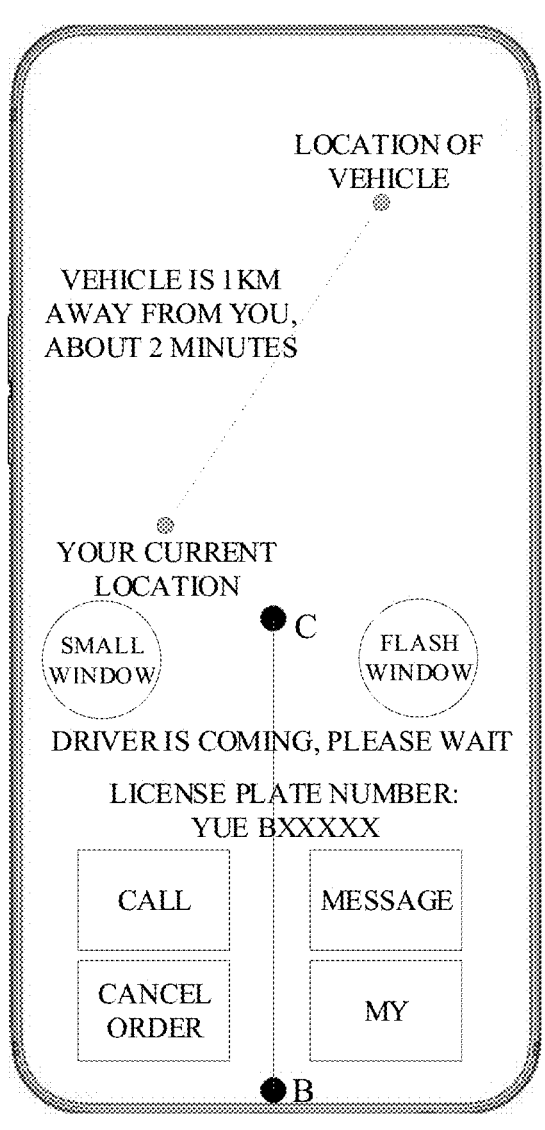

For example, as illustrated in FIG. 4, a running interface of car-hailing application Y is currently displayed on the display screen, then car-hailing application Y is the target application. On the running interface of car-hailing application Y, the finger of the user slides on the touch display screen from bottom position B (see the position of the black dot in FIG. 4) of the display screen to position C (see the position of the black dot in FIG. 4). The distance dl between position B and position C is equal to the first preset length. At this time, the electronic device determines that the received first gesture includes the preset trigger gesture, and triggers the display screen to display two icons, i.e., the first icon and the second icon, where the first window mode represented by the first icon may be referred to as a small window mode, and the second window mode represented by the second icon may be referred to as a flash window mode. In the small window mode, the scaled down running interface of the target application may be displayed in the first target area on the display screen. In the flash window mode, the customized information of the target application may be displayed in the second target area on the display screen. The window area in the flash window mode is smaller than the window area in the small window mode.

In other implementations, the preset trigger gesture may also be other gestures. For example, the preset trigger gesture may be a slide-down operation starting from the top of the touch display screen, and a slide trajectory corresponding to the slide-down operation reaches a first preset length. Alternatively, the preset trigger gesture may be a slide-right operation starting from the left edge of the touch display screen, and a slide trajectory corresponding to the slide-right operation reaches a first preset length. Alternatively, the preset trigger gesture may be a slide-left operation starting from the right edge of the touch display screen, and a slide trajectory corresponding to the slide-left operation reaches a first preset length, etc.

That is, in implementations of the disclosure, when the first gesture is decomposed into the first gesture-segment and the second gesture-segment, the matching between the first gesture-segment and the preset trigger gesture may include that a motion of the first gesture-segment is the same as a motion of the preset trigger gesture and a trajectory length of the first gesture-segment is greater than or equal to the first preset length. The motion of the first gesture-segment being the same as the motion of the preset trigger gesture may mean that, for example, the first gesture-segment is a slide-up operation, and the preset trigger gesture is also a slide-up operation, or the first gesture-segment is a slide-down operation, and the preset trigger gesture is also a slide-down operation, etc.

In an implementation, the preset trigger gesture may start at an edge of the touch display screen. For example, the preset trigger gesture starts at the bottom edge, the top edge, the left edge, or the right edge of the touch display screen. For example, the preset trigger gesture starts at the bottom edge of the touch display screen, the preset trigger gesture is a slide-up operation starting from the bottom edge of the touch display screen and the slide distance of the slide-up operation is greater than or equal to the first preset length. For another example, the preset trigger gesture starts at the top edge of the touch display screen, the preset trigger gesture is a slide-down operation starting from the top edge of the touch display screen and the slide distance of the slide-down operation is greater than or equal to the first preset length, etc.

203. A gesture end position of the first gesture is obtained.

204. A window mode represented by an icon is determined as a target window mode, upon detecting that the gesture end position of the first gesture is at a display position of the icon.

205. Information of a target application is obtained, and the information of the target application is displayed in the target window mode.

For example, 203, 204, 205 may include the following.

After the first icon and the second icon are displayed, if the finger of the user does not leave the touch display screen, the user may continue to make a touch gesture on the touch display screen.

The electronic device may obtain the gesture end position of the first gesture and detect whether the gesture end position of the first gesture is at a display position of a certain icon, upon detecting that the first gesture ends.

It should be noted that, the gesture end position of the first gesture being at the display position of a certain icon may mean that, for example, a display position of a certain icon is position A, if the gesture end position of the first gesture is also position A, the gesture end position of the first gesture is at the display position of the icon. For example, if the first gesture is a touch operation on the touch display screen, a touch position of the last touch operation is the gesture end position of the first gesture. For example, if the finger of the user slides to position A of the touch display screen and then leaves the touch display screen, the touch position of the last touch operation is position A. If a display position of a certain icon is also position A, the gesture end position of the first gesture is at the display position of the icon.

It should be noted that, when the first gesture is decomposed into the first gesture-segment and the second gesture-segment, the gesture end position of the first gesture is also a gesture end position of the second gesture-segment.

The electronic device may perform other operations upon detecting that the gesture end position of the first gesture is not at a display position of any icon.

The electronic device may determine a window mode represented by an icon as the target window mode, upon detecting that the gesture end position of the first gesture is at a display position of the icon. Then, the electronic device can obtain the information of the target application, and display the information of the target application in the target window mode.

Figure 5:
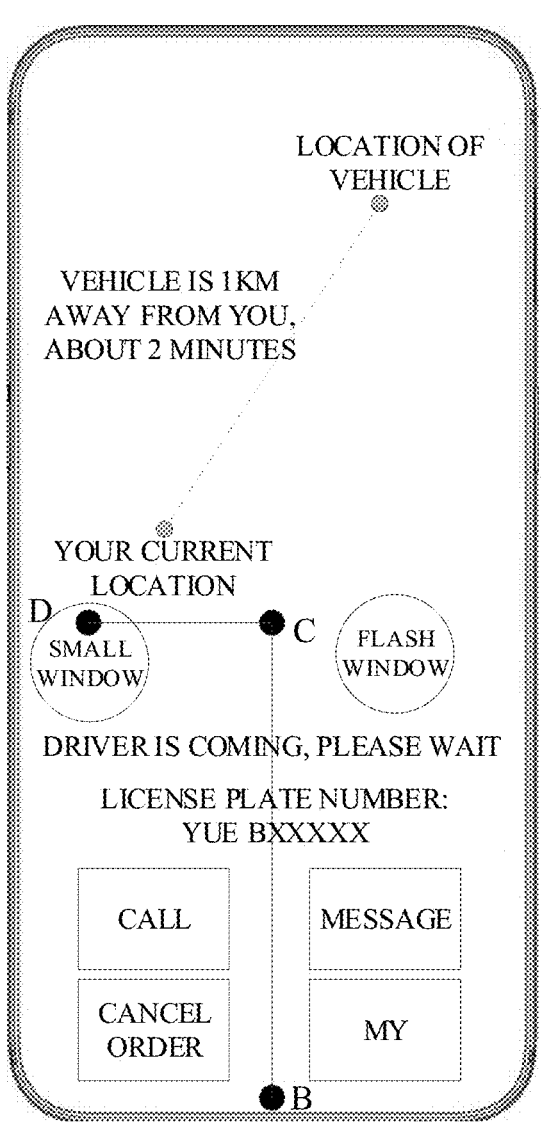
Figure 6:
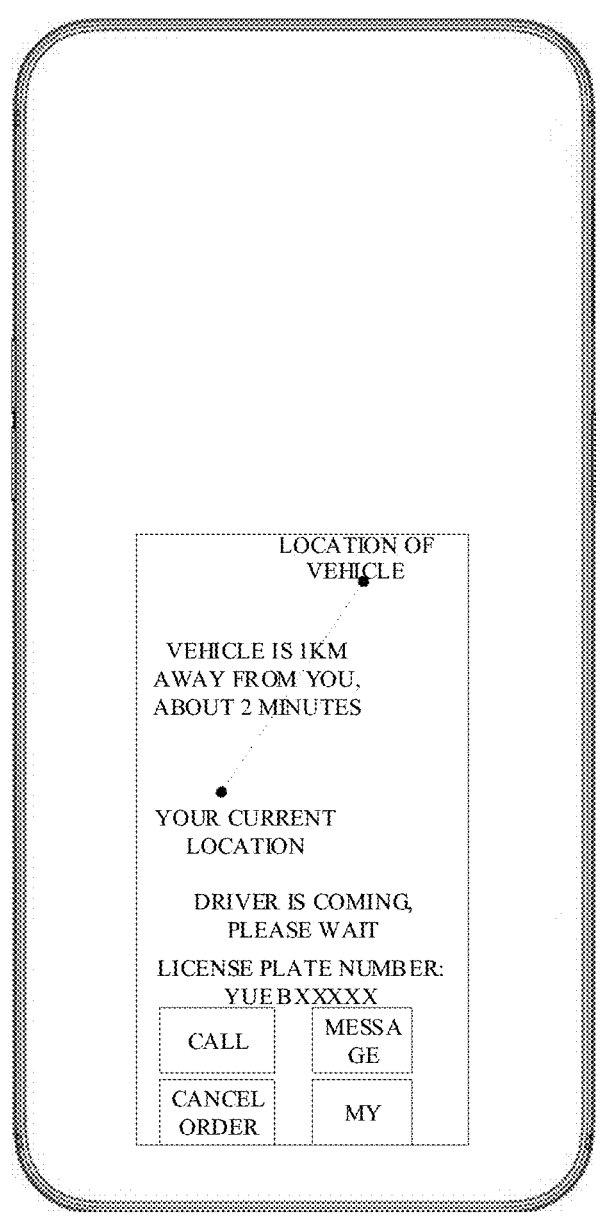

For example, as illustrated in FIG. 5, the finger of the user does not leave the touch display screen after sliding to position C, but continues to slide to position D (see the position of the black dot in FIG. 5), and leaves the touch display screen after sliding to position D. That is, the gesture end position of the first gesture is position D. The slide trajectory starting from position B, passing through position C, and ending at position D is continuous and position D is at the display position of the first icon, therefore, the electronic device can determine the small window mode represented by the first icon as the target window mode. Then, the electronic device can obtain information of a current target application, i.e., car-hailing application Y, and display the information of car-hailing application Y in the small window mode. For example, as illustrated in FIG. 6, the first target area determined by the electronic device on the touch display screen is an area in the middle of the lower half of the display screen. Then, the electronic device may display in the first target area the scaled down running interface of car-hailing application Y.

In other implementations, the first target area may also be other areas of the display screen. For example, the first target area may be in the middle of the upper half of the display screen, in the middle of the left two-thirds of the display screen, or in the middle of the right two-thirds of the display screen, etc., which is not limited herein.

It should be noted that, as illustrated in FIG. 5, the first gesture starts from position B, passes through position C, and ends at position D, and has a continuous slide trajectory. In these implementations, the first gesture can be decomposed into a first gesture-segment and a second gesture-segment. The first gesture-segment may be a gesture-segment from position B to position C, and the second gesture-segment may be a gesture-segment from position C to position D. As illustrated in FIG. 5, the first gesture-segment and the second gesture-segment have a continuous slide trajectory. That is, the finger of the user never leaves the touch display screen during making the first-gesture-segment and the second-gesture-segment.

Figure 7:
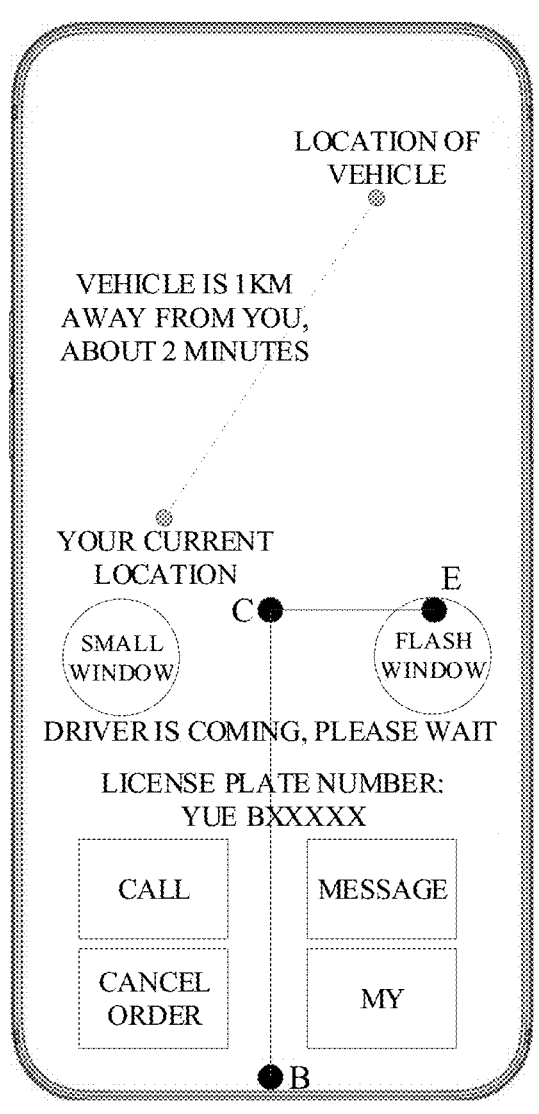
Figure 8:
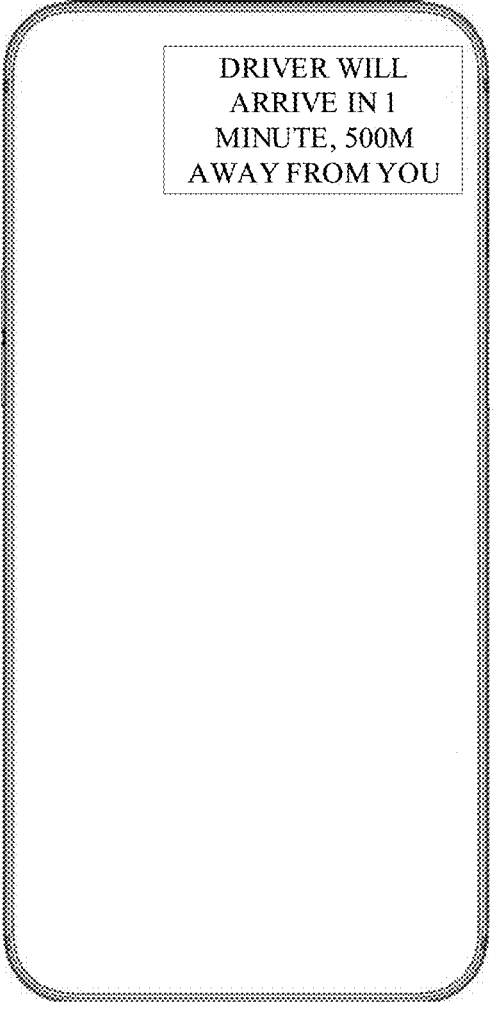

For another example, as illustrated in FIG. 7, the finger of the user does not leave the touch display screen after sliding to position C, but continues to slide to position E (see the position of the black dot in FIG. 7), and leaves the touch display screen after sliding to position E. That is, the gesture end position of the first gesture is position E. The slide trajectory starting from position B, passing through position C, and ending at position E is continuous and position E is at the display position of the second icon, therefore, the electronic device can determine the flash window mode represented by the second icon as the target window mode. Then, the electronic device can obtain information of a current target application, i.e., car-hailing application Y, and display the latest notification information of car-hailing application Y in the flash window mode. For example, as illustrated in FIG. 8, the second target area determined by the electronic device on the touch display screen is an area in the upper right corner of the display screen. Then, the electronic device may display in the second target area the latest notification information of car-hailing application Y.

In other implementations, the second target area may also be other areas of the display screen. For example, the second target area may be in the upper left corner of the display screen, in the lower left corner of the display screen, or in the lower right corner of the display screen, etc., which is not limited herein.

It should be noted that, as illustrated in FIG. 7, the first gesture starts from position B, passes through position C, and ends at position E, and has a continuous slide trajectory. In these implementations, the first gesture can be decomposed into a first gesture-segment and a second gesture-segment. The first gesture-segment may be a gesture-segment from position B to position C, and the second gesture-segment may be a gesture-segment from position C to position E. As illustrated in FIG. 7, the first gesture-segment and the second gesture-segment have a continuous slide trajectory. That is, the finger of the user never leaves the touch display screen during making the first-gesture-segment and the second-gesture-segment.

Moreover, in implementations of the disclosure, the window position in the small window mode and the flash window mode may be readjusted by the user. For example, the user may select the window and then drag the window to another position, etc.

In another implementation, in addition to the touch operation performed on the touch display screen, the first gesture may also be an air gesture. For example, when the first gesture is decomposed into the first gesture-segment and the second gesture-segment, the first gesture-segment and the second gesture-segment may also be air gestures. The first gesture-segment and the second gesture-segment having a continuous gesture trajectory may include: the first gesture-segment and the second gesture-segment having a continuous air gesture trajectory. That is, the air gesture made by the user is also a coherent gesture.

Implementations of the disclosure may further include the following.

A displayed running interface of the target application is scaled down gradually, from receiving the first gesture until the first gesture ends.

Figure 9:
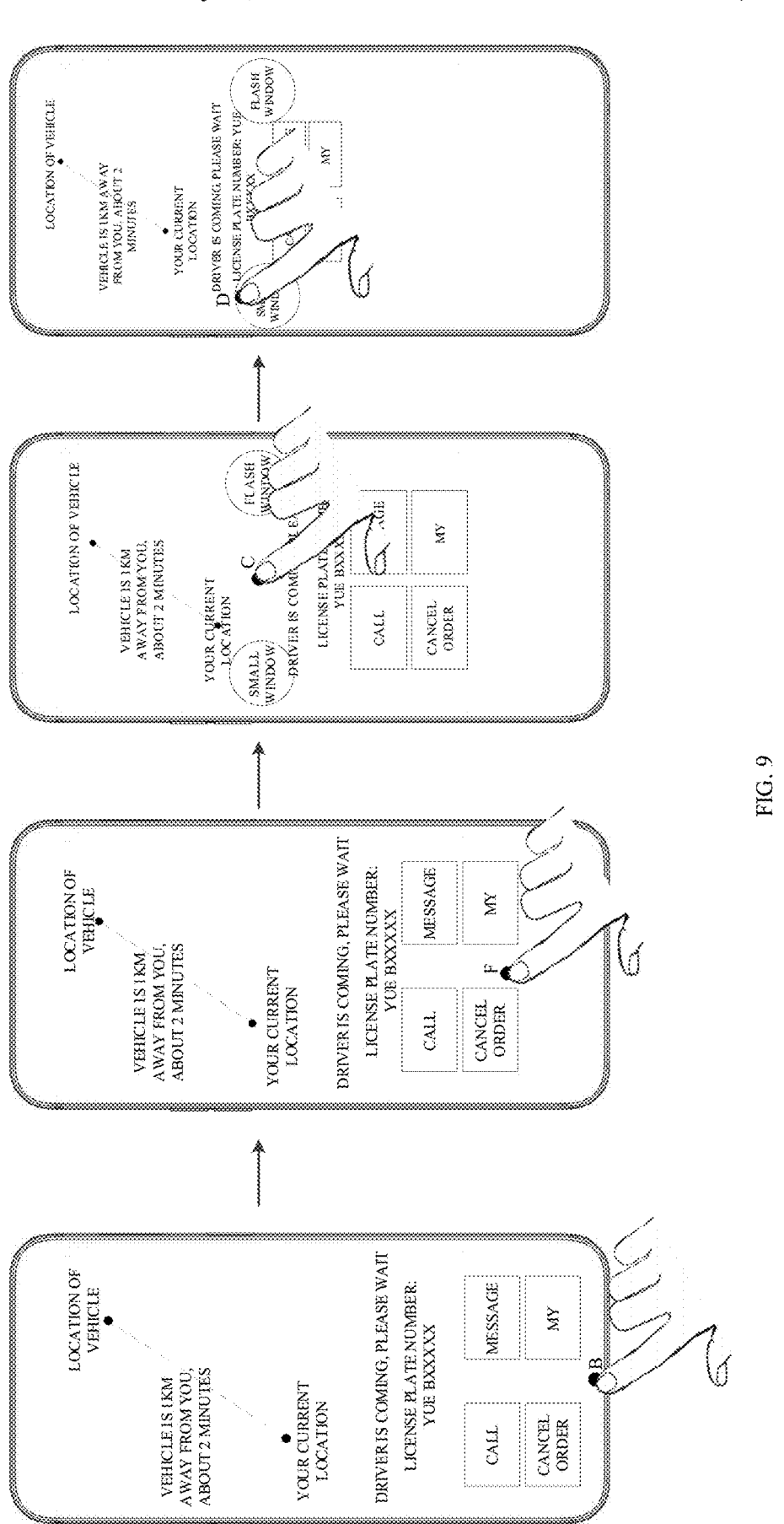

For example, the preset trigger gesture is a slide-up operation starting from the bottom of the touch display screen, and the length of the slide trajectory is greater than or equal to the first preset length. Then, as illustrated in FIG. 5, when the finger of the user slides up from position B at the bottom of the touch display screen to position C and then slides left to position D, the running interface of car-hailing application Y displayed by the electronic device can be gradually scaled down. For example, the process of gradually scaling down the running interface of car-hailing application Y can be as illustrated in FIG. 9. For example, as illustrated in FIG. 9, when the finger of the user slides up from position B at the bottom of the touch display screen, passes through position F (see the position of the black dot in FIG. 9) and position C, and then slides left to position D, the running interface of car-hailing application Y displayed by the electronic device can be gradually scaled down.

In an implementation, the electronic device may gradually scale down the displayed running interface of the target application as follows. The electronic device gradually scales down the displayed running interface of the target application to a preset size. That is, the electronic device may no longer scale down the running interface of the target application when the running interface is scaled down to the preset size.

In an implementation, as illustrated in FIG. 9, when gradually scaling down the running interface of the target application, the electronic device may move the gradually scaled down running interface in a preset direction. For example, when the preset trigger gesture is a slide-up operation starting from the bottom of the touch display screen, and the length of the slide trajectory is greater than or equal to the first preset length, the gradually scaled down running interface can be moved towards the upper half of the display screen. For another example, when the preset trigger gesture is a slide-down operation starting from the top of the touch display screen, and the length of the slide trajectory is greater than or equal to the first preset length, the gradually scaled down running interface can be moved towards the lower half of the display screen.

Implementations of the disclosure may further include the following.

The electronic device displays at a preset position of the touch display screen a preview of a window mode represented by an icon, on condition that the first gesture pauses at a display position of the icon, before the first gesture ends.

Figure 10:
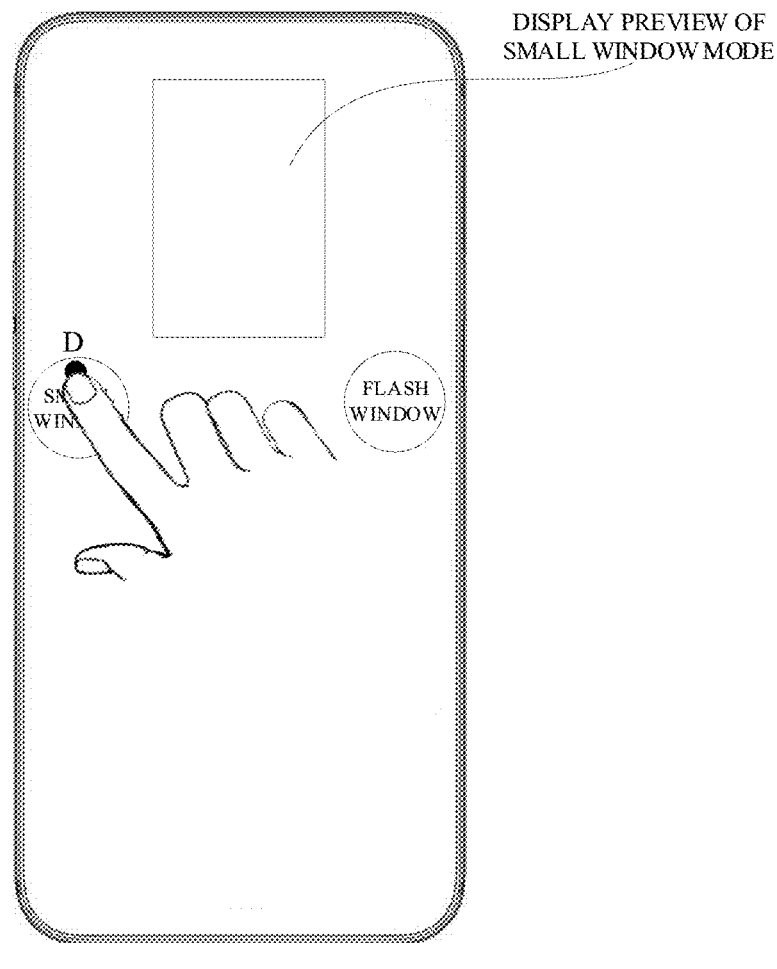

For example, when the finger of the user slides to position D for a pause but still does not leave the touch display screen, the electronic device may display at the preset position of the touch display screen the preview of the first window mode represented by the first icon. For example, as illustrated in FIG. 10, the electronic device may display in the middle of the upper half (i.e., the preset position) of the display screen the preview of displaying the running interface of car-hailing application Y in the small window mode.

Figure 11:
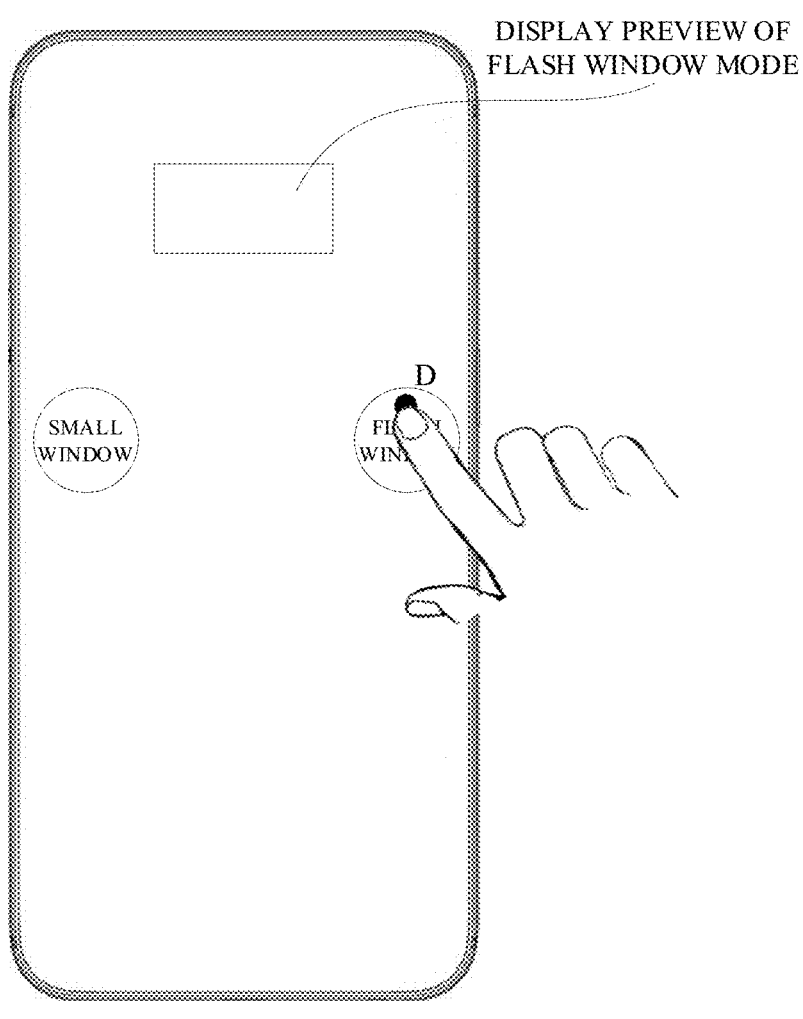

For another example, when the finger of the user slides from position D to position E for a pause but still does not leave the touch display screen, the electronic device may display at the preset position of the touch display screen the preview of the second window mode represented by the second icon. For example, as illustrated in FIG. 11, the electronic device may display in the middle of the upper half (i.e., the preset position) of the display screen the preview of displaying the latest notification information of car-hailing application Y in the flash window mode.

It should be noted that, when the first gesture is a touch operation performed on the touch display screen, the end of the first gesture may refer to an event where the electronic device detects that the finger of the user leaves the touch display screen. For example, as illustrated in FIG. 5, the finger of the user slides from position B on the touch display screen, passes through position C, and leaves the touch display screen when sliding to position D. Then, the electronic device detects that the first gesture ends upon detecting that the finger of the user leaves the touch display screen from position D.

When the first gesture is an air gesture, for example, for an air gesture recognition technology where the palm movement of the user is detected with a camera, the recognition process of detecting the air gesture with a camera generally includes gesture image capture, gesture segmentation, gesture feature extraction, and gesture detection. Then, the end of the first gesture may refer to that the electronic device captures with the camera an action of the user putting his or her palm down. For example, when making an air gesture, the user needs to raise his palm and make a motion. When the action of the user putting the palm down is captured, the air gesture can be considered to be completed.

It can be understood that, in implementations of the disclosure, as illustrated in FIGS. 5 and 7, the whole process for the electronic device to enter the small window mode (corresponding to the gesture operation starting from position B, passing through position C, and ending at position D) or the flash window mode (corresponding to the gesture operation starting from position B, passing through position C, and ending at position E) is completed in one go. That is, it only takes one step to switch to the corresponding window mode, with high operation efficiency and good user experience.

Implementations of the disclosure may further include the following.

Information of a second gesture is received. Specifically, the second gesture is received.

A multi-task management interface is entered, on condition that a motion of the second gesture is the same as the motion of the preset trigger gesture and a trajectory length of the second gesture is less than the first preset length and greater than a second preset length.

For example, the preset trigger gesture is a slide-up operation starting from the bottom of the touch display screen, and the length of the slide trajectory is greater than or equal to the first preset length. If the second gesture received by the electronic device is also a slide-up operation (that is, the motion of the second gesture is the same as the motion of the preset trigger gesture), and the trajectory length of the second gesture is less than the first preset length and greater than the second preset length, for example, the trajectory length corresponding to the slide-up operation of the finger of the user is between the second preset length and the first preset length, and then the finger of the user leaves the touch display screen, the electronic device can enter the multi-task management interface.

Figure 12:
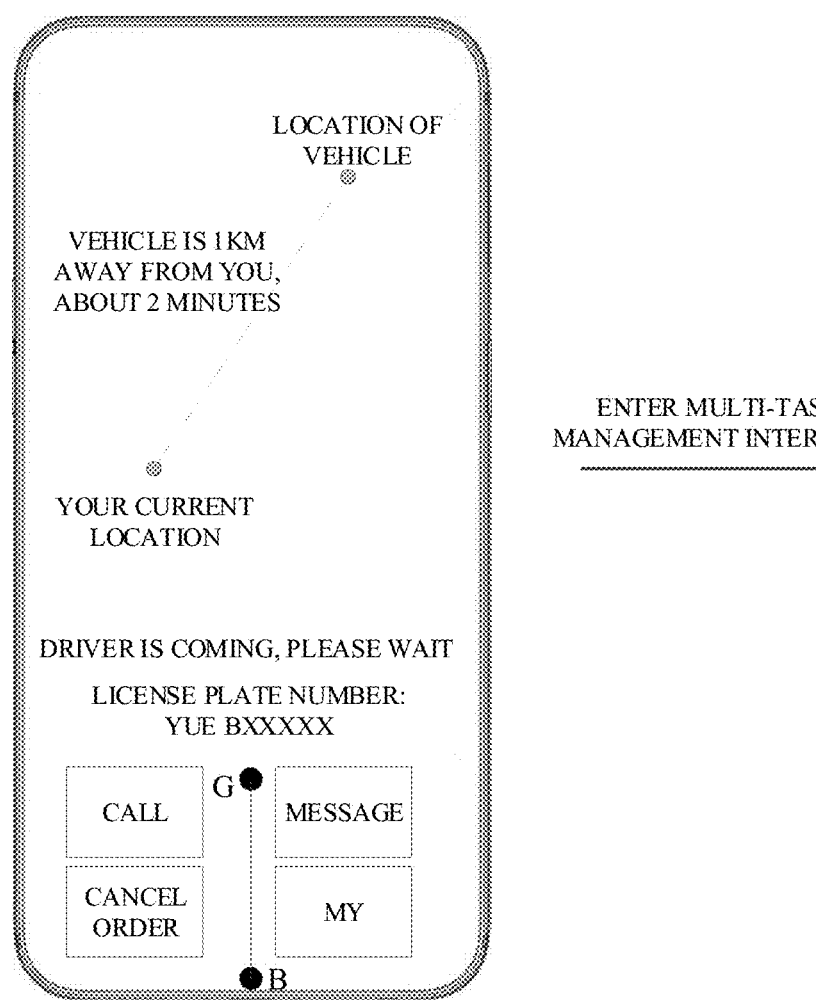

For example, the preset trigger gesture is a slide-up operation starting from the bottom of the touch display screen, and the length of the slide trajectory is greater than or equal to the first preset length. As illustrated in FIG. 12, the finger of the user slides up from position B at the bottom of the touch display screen to the G position, but the length of the slide trajectory between position B and position G is between the second preset length and the first preset length. After sliding to position G, the finger of the user leaves the touch display screen. At this time, the multi-task management interface can be entered.

It can be understood that, multiple responses to a same gesture can be realized in the above-mentioned manner. That is, for a same motion, the electronic device can respond differently for different gesture trajectory lengths. For example, for a same slide-up gesture, when the trajectory length of the slide-up gesture is greater than or equal to the first preset length, the electronic device may display the first icon and the second icon, and when the trajectory length of the slide-up gesture is less than the first preset length and greater than or equal to the second preset length, the electronic device can enter the multi-task management interface.

In an implementation, after displaying the information of the target application in the target window mode, the electronic device may return to the desktop. For example, in FIG. 6, after displaying the running interface of car-hailing application Y in the small window mode, the electronic device displays the desktop interface in the area other than the small window on the touch display screen. For another example, in FIG. 8, after displaying the latest notification information of car-hailing application Y in the flash window mode, the electronic device displays the desktop interface in the area other than the flash window on the touch display screen.

Figure 13:
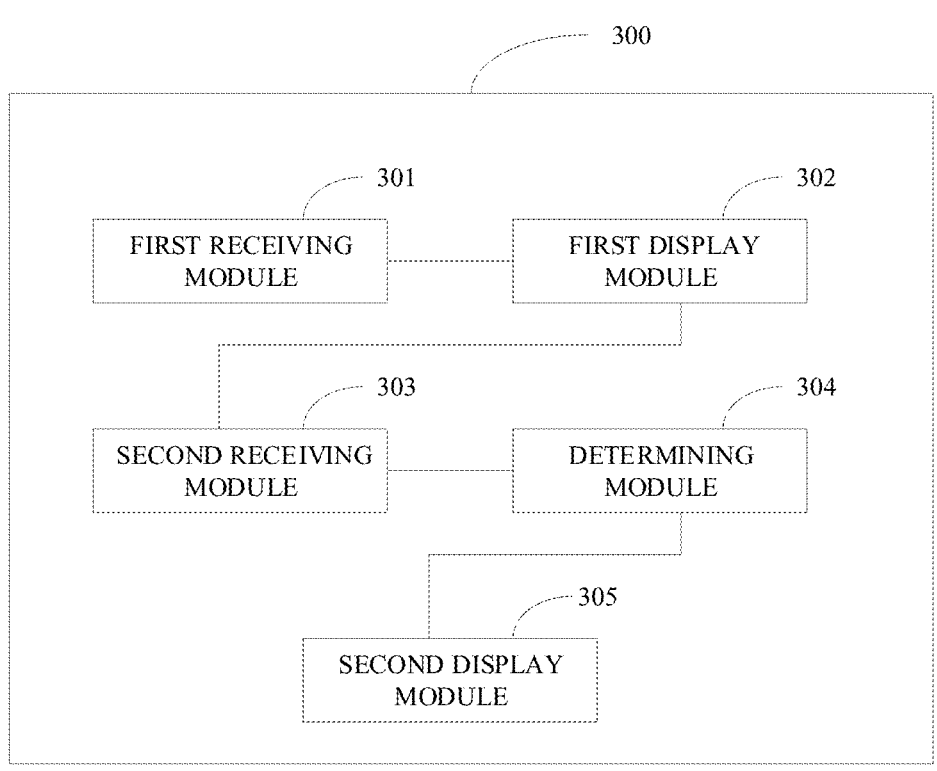
FIG. 13 is a schematic structural diagram of an apparatus for device control provided in implementations of the disclosure.

Referring to FIG. 13, FIG. 13 is a schematic structural diagram of an apparatus for device control provided in implementations of the disclosure. The apparatus for device control may be applied to an electronic device with a touch display screen. The apparatus for device control 300 may include: a first receiving module 301, a first display module 302, a second receiving module 303, a determining module 304, and a second display module 305.

The first receiving module 301 is configured to receive information of a first gesture. The first display module 302 is configured to display at least one icon on condition that the first gesture includes a preset trigger gesture, where each icon represents one window mode. The second receiving module 303 is configured to obtain a gesture end position of the first gesture. The determining module 304 is configured to determine a window mode represented by an icon as a target window mode, upon detecting that the gesture end position of the first gesture is at a display position of the icon. The second display module 305 is configured to obtain information of a target application, and display the information of the target application in the target window mode, where the target application is an application corresponding to information displayed on the touch display screen when the first gesture is received.

In an implementation, the first gesture includes a first gesture-segment and a second gesture-segment, the first gesture-segment occurs before the second gesture-segment, the first gesture-segment and the second gesture-segment have a continuous gesture trajectory, and then the first gesture including the preset trigger gesture may include: the first gesture-segment matching the preset trigger gesture.

In an implementation, the icon displayed by the electronic device includes at least a first icon, and a first window mode represented by the first icon includes: determining a first target area on the touch display screen, and displaying in the first target area a scaled down running interface of the target application.

In an implementation, the icon displayed by the electronic device further include at least a second icon, and a second window mode represented by the second icon includes: determining a second target area on the touch display screen, and displaying in the second target area the information of the target application, where an area of the second target area is smaller than an area of the first target area.

In an implementation, the second window mode represented by the second icon includes: determining the second target area on the touch display screen, and displaying in the second target area customized information of the target application.

In an implementation, the first gesture-segment and the second gesture-segment of the first gesture include a touch operation performed on the touch display screen, and then the first gesture-segment and the second gesture-segment having the continuous gesture trajectory may include: the first gesture-segment and the second gesture-segment having a continuous touch trajectory on the touch display screen.

In an implementation, the first gesture-segment and the second gesture-segment of the first gesture each include an air gesture, and then the first gesture-segment and the second gesture-segment having the continuous gesture trajectory may include: the first gesture-segment and the second gesture-segment having a continuous air gesture trajectory.

In an implementation, the first display module 302 may be configured to: determine that the first gesture-segment matches the preset trigger gesture and display the at least one icon, on condition that a motion of the first gesture-segment is the same as a motion of the preset trigger gesture and a trajectory length of the first gesture-segment is greater than or equal to a first preset length.

In an implementation, the preset trigger gesture starts at an edge of the touch display screen.

In an implementation, the second display module 305 may be further configured to: scale down a displayed running interface of the target application to a preset size gradually, from receiving the first gesture until the first gesture ends.

In an implementation, the second display module 305 may be further configured to: move the gradually scaled down running interface of the target application in a preset direction.

In an implementation, the second display module 305 may be further configured to: display at a preset position of the touch display screen a preview of a window mode represented by an icon, on condition that the first gesture pauses at a display position of the icon, before the first gesture ends.

In an implementation, the second display module 305 may be further configured to: receive information of a second gesture, and enter a multi-task management interface, on condition that a motion of the second gesture is the same as the motion of the preset trigger gesture and a trajectory length of the second gesture is less than the first preset length and greater than a second preset length.

Implementations of the disclosure provide a computer-readable storage medium storing computer programs, which when executed on a computer, cause the computer to perform the method for device control provided in implementations.

Implementations of the disclosure further provide an electronic device. The electronic device includes a memory and a processor. The processor is configured to invoke computer programs stored in the memory to perform the method for device control provided in implementations.

Figure 14:
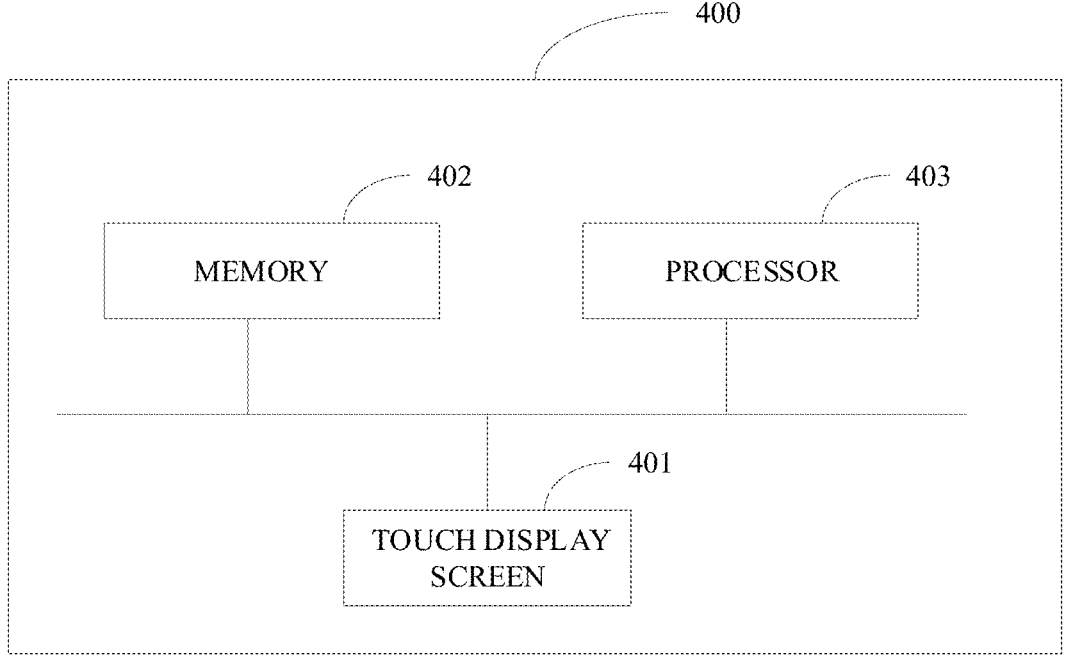
FIG. 14 is a schematic structural diagram of an electronic device provided in implementations of the disclosure.

For example, the electronic device may be a mobile terminal such as a tablet computer or a smart phone. Referring to FIG. 14, FIG. 14 is a schematic structural diagram of an electronic device provided in implementations of the disclosure.

The electronic device 400 may include a touch display screen 401, a memory 402, a processor 403, and other components. Those skilled in the art can understand that the structure of the electronic device illustrated in FIG. 14 does not constitute any limitation on the electronic device. The electronic device may include more or fewer components than illustrated or may combine certain components or different components.

The touch display screen 401 may be configured to display information such as text, images, etc., and may be further configured to receive a touch operation of the user.

The memory 402 may be configured to store application programs and data. The application programs stored in the memory 402 contains executable codes. The application programs may compose various functional modules. The processor 403 is configured to implement various functional applications and data processing by executing the application programs stored in the memory 402.

The processor 403 is the control center of the electronic device, connects various parts of the entire electronic device with various interfaces and lines, and is configured to implement various functions and data processing of the electronic device by running or executing the application programs stored in the memory 402 and by invoking the data stored in the memory 402, thereby monitoring the electronic device as a whole.

In these implementations, the processor 403 in the electronic device loads executable codes corresponding to the process of one or more application programs into the memory 402 according to the following instructions, and the processor 403 is configured to execute the application programs stored in the memory 402 to: receive information of a first gesture, display at least one icon on condition that the first gesture includes a preset trigger gesture, where each icon represents one window mode, obtain a gesture end position of the first gesture, determine a window mode represented by an icon as a target window mode, upon detecting that the gesture end position of the first gesture is at a display position of the icon, and obtain information of a target application, and display the information of the target application in the target window mode, where the target application is an application corresponding to information displayed on the touch display screen when the first gesture is received.

Figure 15:
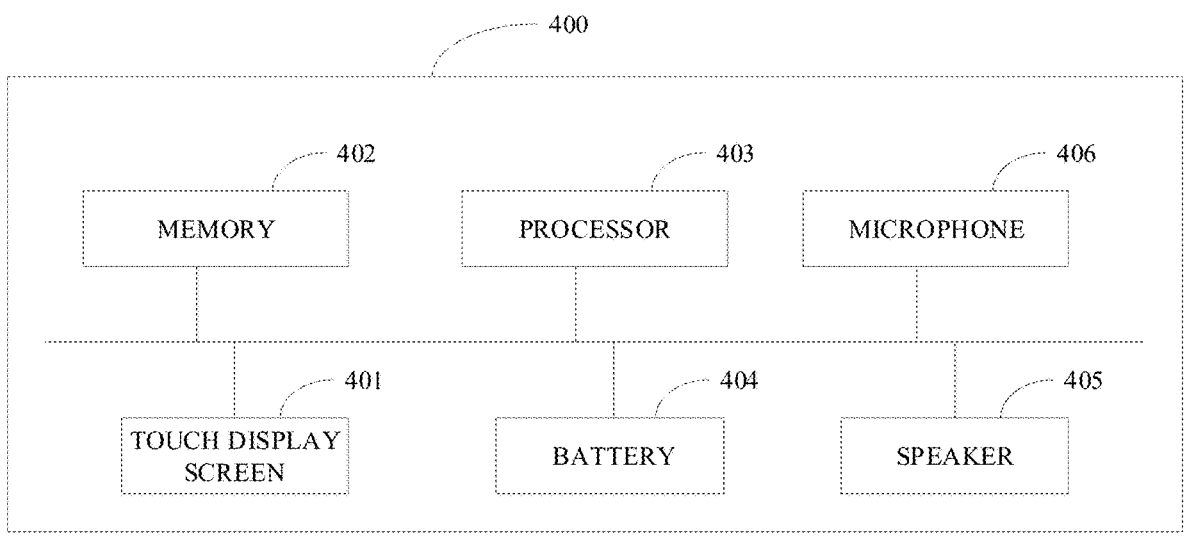
FIG. 15 is another schematic structural diagram of an electronic device provided in implementations of the disclosure.

Referring to FIG. 15, the electronic device 400 may include a touch display screen 401, a memory 402, a processor 403, a battery 404, a speaker 405, a microphone 406, etc.

The touch display screen 401 may be configured to display information such as text, images, etc., and may be further configured to receive a touch operation of the user.

The memory 402 may be configured to store application programs and data. The application programs stored in the memory 402 contains executable codes. The application programs may compose various functional modules. The processor 403 is configured to implement various functional applications and data processing by executing the application programs stored in the memory 402.

The processor 403 is the control center of the electronic device, uses various interfaces and lines to connect various parts of the entire electronic device, and implements various functions and data processing of the electronic device by running or executing the application programs stored in the memory 402 and by invoking the data stored in the memory 402, thereby monitoring the electronic device as a whole.

The battery 404 can provide power support for respective components and modules of the electronic device, thereby ensuring the normal operation of the components and modules.

The speaker 405 may be configured to play a sound signal. For example, the speaker 405 plays a sound signal in a multimedia image.

The microphone 406 may be configured to collect a sound signal in the surrounding environment. For example, the microphone 406 may be configured to collect the voice of the user, and convert the collected voice into a corresponding voice signal.

In these implementations, the processor 403 in the electronic device loads executable codes corresponding to the process of one or more application programs into the memory 402 according to the following instructions, and the processor 403 executes the application programs stored in the memory 402 to: receive information of a first gesture, display at least one icon on condition that the first gesture includes a preset trigger gesture, where each icon represents one window mode, obtain a gesture end position of the first gesture, determine a window mode represented by an icon as a target window mode, upon detecting that the gesture end position of the first gesture is at a display position of the icon, and obtain information of a target application, and display the information of the target application in the target window mode, where the target application is an application corresponding to information displayed on the touch display screen when the first gesture is received.

In an implementation, the first gesture includes a first gesture-segment and a second gesture-segment, the first gesture-segment occurs before the second gesture-segment, the first gesture-segment and the second gesture-segment have a continuous gesture trajectory, and the first gesture including the preset trigger gesture may include: the first gesture-segment matching the preset trigger gesture.

In an implementation, the icon displayed by the electronic device includes at least a first icon, and a first window mode represented by the first icon includes: determining a first target area on the touch display screen, and displaying in the first target area a scaled down running interface of the target application.

In an implementation, the icon displayed by the electronic device further include at least a second icon, and a second window mode represented by the second icon includes: determining a second target area on the touch display screen, and displaying in the second target area the information of the target application, where an area of the second target area is smaller than an area of the first target area.

In an implementation, the second window mode represented by the second icon includes: determining the second target area on the touch display screen, and displaying in the second target area customized information of the target application.

In an implementation, the first gesture-segment and the second gesture-segment of the first gesture include a touch operation performed on the touch display screen, and then the first gesture-segment and the second gesture-segment having the continuous gesture trajectory may include: the first gesture-segment and the second gesture-segment having a continuous touch trajectory on the touch display screen.

In an implementation, the first gesture-segment and the second gesture-segment of the first gesture each include an air gesture, and then the first gesture-segment and the second gesture-segment having the continuous gesture trajectory may include: the first gesture-segment and the second gesture-segment having a continuous air gesture trajectory.

In an implementation, the processor 403 configured to display the at least one icon on condition that the first gesture-segment matches the preset trigger gesture is configured to: determine that the first gesture-segment matches the preset trigger gesture and display the at least one icon, on condition that a motion of the first gesture-segment is the same as a motion of the preset trigger gesture and a trajectory length of the first gesture-segment is greater than or equal to a first preset length.

In an implementation, the preset trigger gesture starts at an edge of the touch display screen.

In an implementation, the processor 403 may be further configured to: scale down a displayed running interface of the target application to a preset size gradually, from receiving the first gesture until the first gesture ends.

In an implementation, the processor 403 may be further configured to: move the gradually scaled down running interface of the target application in a preset direction.

In an implementation, the processor 403 may be further configured to: display at a preset position of the touch display screen a preview of a window mode represented by an icon, on condition that the first gesture pauses at a display position of the icon, before the first gesture ends.

In an implementation, the processor 403 may be further configured to: receive information of a second gesture, and enter a multi-task management interface, on condition that a motion of the second gesture is the same as the motion of the preset trigger gesture and a trajectory length of the second gesture is less than the first preset length and greater than a second preset length.

In the above-mentioned implementations, the description of each implementation has its own emphasis. For parts that are not described in detail in a certain implementation, reference may be made to the description of the method for device control above, which will not be repeated herein.

The apparatus for device control provided in implementations of the disclosure and the method for device control in above implementations belong to a same concept, and any method provided in implementations of the method for device control can be executed on the apparatus for device control. For details of implementations, reference may be made to implementations of the method for device control, which will not be repeated herein.

It should be noted that, for the method for device control described in implementations of the disclosure, it can be understood by those of ordinary skill in the art that all or part of the process for implementing the method for device control described in implementations of the disclosure can be accomplished by controlling the relevant hardware using computer programs. The computer programs may be stored in a computer-readable storage medium, such as a memory, and executed by at least one processor, and the execution process may include a process as described in implementations of the method for device control. The storage medium may be a magnetic disk, an optical disk, a read only memory (ROM), a random access memory (RAM), etc.

For the apparatus for device control in implementations of the disclosure, functional modules of the apparatus can be integrated in a processing chip, or physically and separately exist in the apparatus, and two or more modules of the apparatus can be integrated in a single module. The integrated module can be implemented in a form of hardware or in a form of software function module. If implemented in a form of a software function module, the integrated module may be sold or used as a stand-alone product, and may also be stored in a computer-readable storage medium, such as a ROM, a magnetic disk, or an optical disk, etc.

The method and the apparatus for device control, the storage medium, and the electronic device provided in implementations of the disclosure have been described in detail above. The principles and implementations of the disclosure are described with specific examples. The description of the above implementations are only used to help understand the method and its core idea. For those skilled in the art, according to the conception of the disclosure, specific implementations and application scopes of the disclosure can be varied in certain aspects. In conclusion, the contents of this specification should not be understood as a limitation of the disclosure.

What is claimed is:

1. A method for device control, being applied to an electronic device with a touch display screen and comprising:

receiving a first gesture, the first gesture matching a preset trigger gesture;

displaying at least one icon on the touch display screen in response to receiving the first gesture, each icon representing one window mode;

displaying at a preset position of the touch display screen a preview of a window mode represented by an icon, in response to the first gesture pausing at a display position of the icon, before the first gesture ends;

obtaining an end position of the first gesture;

determining a window mode represented by a target icon in the at least one icon as a target window mode, upon detecting that the end position of the first gesture is at a display position of the target icon;

obtaining information of a target application, and displaying the information of the target application in the target window mode, the target application being an application corresponding to information displayed on the touch display screen when the first gesture is received; and displaying a desktop interface in an area other than an area corresponding to the target window mode;

wherein the first gesture comprises a first gesture-segment and a second gesture-segment, the first gesture-segment occurs before the second gesture-segment, the first gesture-segment and the second gesture-segment have a continuous gesture trajectory, and the first gesture matches the preset trigger gesture when the first gesture-segment matches the preset trigger gesture;

wherein the first gesture-segment matches the preset trigger gesture when a motion of the first gesture-segment is the same as a motion of the preset trigger gesture and a length of a trajectory of the first gesture-segment is greater than or equal to a first preset length;

wherein the method further comprises:

receiving a second gesture; and entering an interface for managing multiple tasks, in response to a motion of the second gesture being the same as the motion of the preset trigger gesture and a length of a trajectory of the second gesture being less than the first preset length and greater than a second preset length.

2. The method of claim 1, wherein the at least one icon comprises a first icon, the target icon is the first icon, the first icon represents a first window mode, and displaying the information of the target application in the target window mode comprises: displaying, in a first target area corresponding to the first window mode, a scaled down running interface of the target application in the first window mode.

3. The method of claim 1, wherein the at least one icon comprises a first icon and a second icon, the target icon is the second icon, the first icon represents a first window mode, the second icon represents a second window mode, and displaying the information of the target application in the target window mode comprises: displaying, in a second target area corresponding to the second window mode, the information of the target application in the second window mode, wherein an area of the second target area is smaller than an area of a first target area corresponding to the first window mode.

4. The method of claim 3, wherein displaying the information of the target application in the target window mode comprises: displaying, in the second target area corresponding to the second window mode, customized information of the target application in the second window mode.

5. The method of claim 4, wherein:

when the target application is an instant messaging application, the customized information of the target application displayed in the second window mode is latest notification information of the instant messaging application; or when the target application is a map navigation application, the customized information of the target application displayed in the second window mode is information of a current location of a user.

6. The method of claim 1, wherein the first gesture-segment and the second gesture-segment are each touch operations performed on the touch display screen, and the first gesture-segment and the second gesture-segment having the continuous gesture trajectory comprises:

the first gesture-segment and the second gesture-segment having a continuous touch trajectory on the touch display screen.

7. The method of claim 1, wherein the first gesture-segment and the second gesture-segment are each air gestures, and the first gesture-segment and the second gesture-segment having the continuous gesture trajectory comprises:

the first gesture-segment and the second gesture-segment having a continuous air gesture trajectory.

8. The method of claim 1, wherein the preset trigger gesture starts at an edge of the touch display screen.

9. The method of claim 1, further comprising:

scaling down a displayed running interface of the target application to a preset size gradually, from receiving the first gesture until the first gesture ends.

10. The method of claim 9, further comprising:

moving the gradually scaled down running interface of the target application in a preset direction.

11. The method of claim 1, wherein different window modes differ in window size, window area, and/or window position.

12. The method of claim 1, wherein the preset trigger gesture comprises at least one of:

a slide-up operation starting from a bottom of the touch display screen with a slide trajectory corresponding to the slide-up operation reaching a first preset length;

a slide-down operation starting from a top of the touch display screen with a slide trajectory corresponding to the slide-down operation reaching the first preset length;

a slide-right operation starting from a left edge of the touch display screen with a slide trajectory corresponding to the slide-right operation reaching the first preset length; or a slide-left operation starting from a right edge of the touch display screen with a slide trajectory corresponding to the slide-left operation reaching the first preset length.

13. The method of claim 1, wherein a window position in a first window mode and a second window mode is re-adjustable by a user.

14. An electronic device comprising:

a touch display screen;

a memory configured to store computer programs; and a processor configured to execute the computer programs to:

receive a first gesture, the first gesture matching a preset trigger gesture;

display at least one icon on the touch display screen in response to receiving the first gesture, each icon representing one window mode;

display at a preset position of the touch display screen a preview of a window mode represented by an icon, in response to the first gesture pausing at a display position of the icon, before the first gesture ends;

obtain an end position of the first gesture;

determine a window mode represented by a target icon in the at least one icon as a target window mode, upon detecting that the end position of the first gesture is at a display position of the target icon;

obtain information of a target application, and display the information of the target application in the target window mode, the target application being an application corresponding to information displayed on the touch display screen when the first gesture is received; and display a desktop interface in an area other than an area corresponding to the target window mode;

wherein the first gesture comprises a first gesture-segment and a second gesture-segment, the first gesture-segment occurs before the second gesture-segment, the first gesture-segment and the second gesture-segment have a continuous gesture trajectory, and the first gesture matches the preset trigger gesture when the first gesture-segment matches the preset trigger gesture;

wherein the first gesture-segment matches the preset trigger gesture when a motion of the first gesture-segment is the same as a motion of the preset trigger gesture and a length of a trajectory of the first gesture-segment is greater than or equal to a first preset length;

wherein the processor is further configured to:

receive a second gesture; and enter an interface for managing multiple tasks, in response to a motion of the second gesture being the same as the motion of the preset trigger gesture and a length of a trajectory of the second gesture being less than the first preset length and greater than a second preset length.

15. The electronic device of claim 14, wherein the at least one icon comprises a first icon, the target icon is the first icon, the first icon represents a first window mode, and the processor configured to display the information of the target application in the target window mode is configured to: display, in a first target area corresponding to the first window mode, a scaled down running interface of the target application in the first window mode.

16. The electronic device of claim 14, wherein the at least one icon comprises a first icon and a second icon, the target icon is the second icon, the first icon represent a first window mode, the second icon represents a second window mode, and the processor configured to display the information of the target application in the target window mode is configured to: display, in a second target area corresponding to the second window mode, the information of the target application in the second window mode, wherein an area of the second target area is smaller than an area of a first target area corresponding to the first window mode.

17. The electronic device of claim 16, wherein the processor configured to display the information of the target application in the target window mode is configured to: display, in the second target area corresponding to the second window mode, customized information of the target application in the second window mode.

18. The electronic device of claim 14, wherein the first gesture-segment and the second gesture-segment are each touch operations performed on the touch display screen, and the first gesture-segment and the second gesture-segment having the continuous gesture trajectory comprises:

the first gesture-segment and the second gesture-segment having a continuous touch trajectory on the touch display screen.

19. A computer-readable storage medium storing computer programs, which when executed by a computer, causes the computer to implement steps, comprising:

receiving a first gesture, the first gesture matching a preset trigger gesture;

displaying at least one icon on a touch display screen in response to receiving the first gesture, each icon representing one window mode;

displaying at a preset position of the touch display screen a preview of a window mode represented by an icon, in response to the first gesture pausing at a display position of the icon, before the first gesture ends;

obtaining an end position of the first gesture;

determining a window mode represented by a target icon in the at least one icon as a target window mode, upon detecting that the end position of the first gesture is at a display position of the target icon;

obtaining information of a target application, and displaying the information of the target application in the target window mode, the target application being an application corresponding to information displayed on the touch display screen when the first gesture is received; and displaying a desktop interface in an area other than an area corresponding to the target window mode;

wherein the first gesture comprises a first gesture-segment and a second gesture-segment, the first gesture-segment occurs before the second gesture-segment, the first gesture-segment and the second gesture-segment have a continuous gesture trajectory, and the first gesture matches the preset trigger gesture when the first gesture-segment matches the preset trigger gesture;

wherein the first gesture-segment matches the preset trigger gesture when a motion of the first gesture-segment is the same as a motion of the preset trigger gesture and a length of a trajectory of the first gesture-segment is greater than or equal to a first preset length;

wherein the steps implemented by the computer further comprise:

receiving a second gesture; and entering an interface for managing multiple tasks, in response to a motion of the second gesture being the same as the motion of the preset trigger gesture and a length of a trajectory of the second gesture being less than the first preset length and greater than a second preset length.

* * * * *